(12) United States Patent
Boufounos

(10) Patent No.: US 9,239,387 B2
(45) Date of Patent: *Jan. 19, 2016

(54) METHOD AND SYSTEM FOR RECONSTRUCTING SCENES USING VIRTUAL ARRAYS OF TRANSDUCERS AND JOINT SPARSITY MODELS

(71) Applicant: Mitsubishi Electric Research Laboratories, Inc., Cambridge, MA (US)

(72) Inventor: Petros Boufounos, Boston, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 563 days.

This patent is subject to a terminal disclaimer.

(21) Appl. No.: 13/721,350

(22) Filed: Dec. 20, 2012

(65) Prior Publication Data

US 2013/0107667 A1 May 2, 2013

Related U.S. Application Data

(63) Continuation-in-part of application No. 12/895,408, filed on Sep. 30, 2010, now Pat. No. 8,400,876.

(51) Int. Cl.
*G01S 15/00* (2006.01)
*G01S 15/89* (2006.01)
*G01S 15/87* (2006.01)
*G06K 9/62* (2006.01)
*G01S 13/89* (2006.01)
*G01S 7/54* (2006.01)

(52) U.S. Cl.
CPC ................ *G01S 15/89* (2013.01); *G01S 13/89* (2013.01); *G01S 15/876* (2013.01); *G06K 9/6249* (2013.01); *G01S 7/54* (2013.01); *G01S 15/003* (2013.01)

(58) Field of Classification Search
CPC ..... G01S 7/295; G01S 13/9035; G01S 15/89; G01S 15/003; G01S 15/876; G01S 7/54; G01S 13/89; G06K 9/6249
USPC .......................................................... 367/88
See application file for complete search history.

(56) References Cited

U.S. PATENT DOCUMENTS

| | | | |
|---|---|---|---|
| 2010/0001901 A1* | 1/2010 | Baraniuk et al. | 342/25 F |
| 2010/0215081 A1* | 8/2010 | Bajwa et al. | 375/147 |
| 2010/0289494 A1* | 11/2010 | Wald et al. | 324/318 |

OTHER PUBLICATIONS

Needell arXiv:0803.2392v2 [math.NA] Apr. 17, 2008, pp. 1-30.*

* cited by examiner

*Primary Examiner* — Luke Ratcliffe
*Assistant Examiner* — Hovhannes Baghdasaryan
(74) *Attorney, Agent, or Firm* — Dirk Brinkman; Gene Vinokur

(57) ABSTRACT

A scene is reconstructed by receiving pulses transmitted by a virtual array of transducers. The pulses are reflected by the scene. The virtual array has a set of configurations subject to positioning errors. Each received pulse is sampled and decomposed to produce frequency coefficients stacked in a set of linear systems modeling a reflectivity of the scene. There is one linear system for each configuration. A reconstruction method is applied to the set of linear systems. The reconstruction method solves each linear system separately to obtain a corresponding solution. The corresponding solutions share information during the solving. Then, the solutions are combined to reconstruct the scene.

13 Claims, 3 Drawing Sheets

300

METHOD AND SYSTEM FOR RECONSTRUCTING SCENES USING VIRTUAL ARRAYS OF TRANSDUCERS AND JOINT SPARSITY MODELS

RELATED APPLICATION

This is a continuation in part application of U.S. application Ser. No. 12/895,408 "Method and System for Sensing Objects in a Scene Using Transducer Arrays and Coherent Wideband Ultrasound Pulses," filed by Boufounos on Sep. 30, 2010, I.S. Publication 20120082004, incorporated herein by reference. The related application detects objects in a scene using wideband ultrasound pulses. The related application uses the same principles during signal acquisition, but a different reconstruction approach, which assumed transducers relative positions are known with a sufficient degree of accuracy.

FIELD OF THE INVENTION

This invention relates reconstructing a scene, and more particular to reconstructing a scene using a virtual array of transducers.

BACKGROUND OF THE INVENTION

A typical prior art sensing system uses single-frequency (narrowband) transducers and time delay estimation to determine distances to locations in a scene. Frequently, the narrowband pulses have a center frequency around 40 kHz and bandwidth of 1-2 kHz, i.e., e.g., the pulses operate in the range of 40 kHz±1 kHz.

Specifically, the systems measure a time delay between transmitted and received pulses. The time delay is multiplied by the speed of the pulses to estimate of the distances to the scene.

Additional information can be obtained by an array of transducers (transmitters and receivers), which transmit the same frequency pulse from each transducer with an appropriate time delay between pulses from different transducers, so that the overall transmission is essentially directed towards a particular location in the scene. This is sometimes called beam steering.

By scanning in different directions, the array can estimate the distances to different locations in the scene. That approach is similar to methods used in medical ultrasound. That approach requires a large number of transducers, or different transducers locations to make an effective array. Furthermore, that scanning approach requires multiple pulse transmissions, one for each direction of the beam, which increases the time before the scene can be sufficiently reconstructed. Also, it is not straightforward to form a virtual, array by moving the array elements because the array moves.

SUMMARY OF THE INVENTION

A scene is reconstructed by transmitting pulses onto a scene. The scene reflects the pulses. The reflected pulses are received by a virtual array of transducers. The virtual array has a set of configurations subject to positioning errors.

Each received pulse is sampled and decomposed to produce frequency coefficients stacked in a set of linear systems modeling a reflectivity of the scene. There is one linear system for each configuration.

A reconstruction method is applied to the set of linear systems. The reconstruction method solves each linear system separately to obtain a corresponding solution. The corresponding solutions share information during the solving, Then, the solutions are combined to reconstruct the scene.

DETAILED DESCRIPTION OF THE PREFERRED EMBODIMENTS

Scene Reconstruction Using a Virtual Array of Transducers

Figure 1:
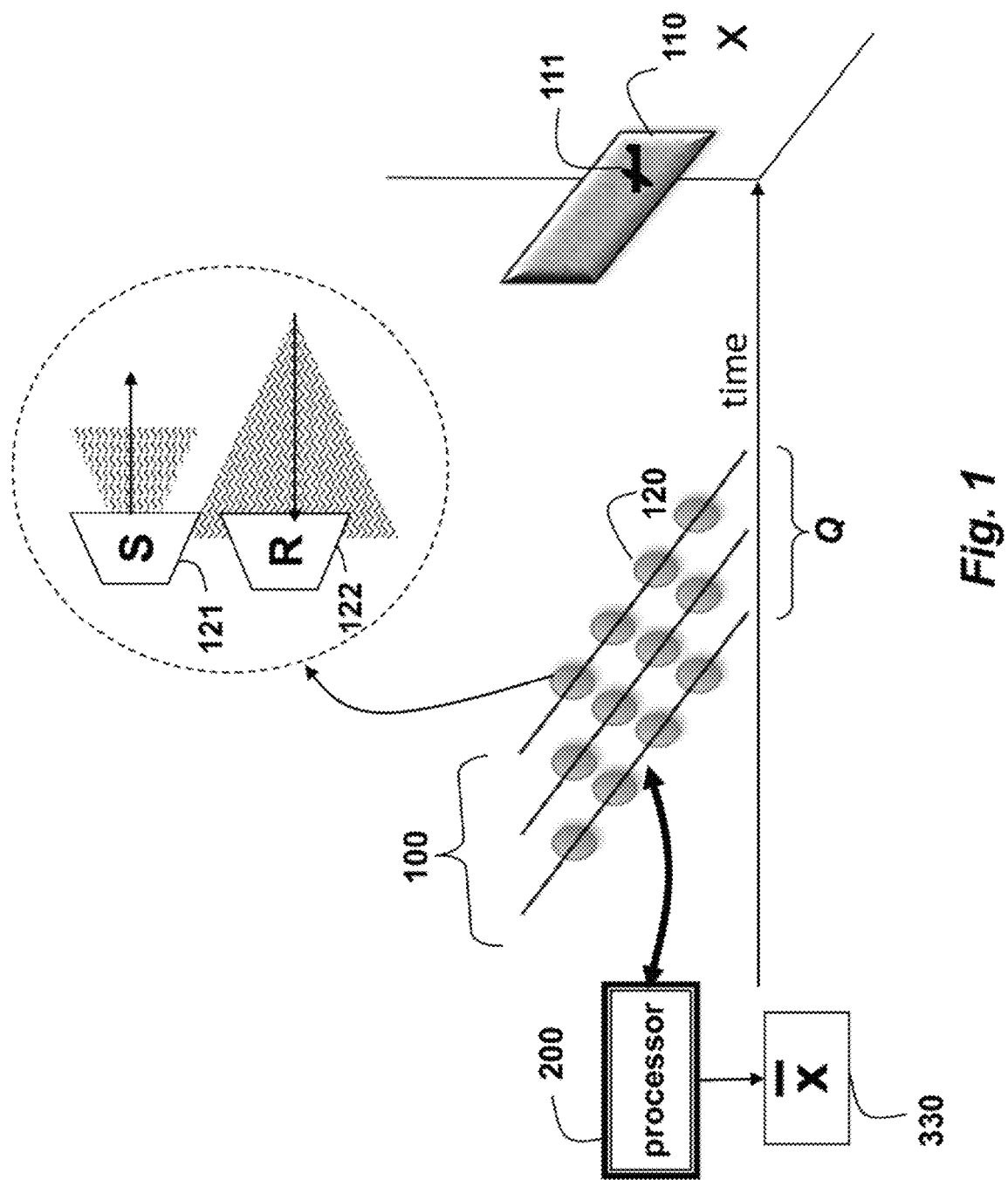
FIG. 1 is a schematic of a virtual array of transducers for reconstructing a scene according to embodiments of the invention.

As shown in FIG. 1, preferred embodiments of the invention reconstruct a scene x 110 as $\bar{x}$ 330 using a virtual array 100 of transducers 120. The reconstruction could enable one to detect an object 111 in the scene.

Each transducer includes a transmitter (S) 121 and receiver (R) 127 which transmit pulses and receive reflections, respectively. In one embodiment, the pulses use wideband ultrasound, although other signaling modalities and frequencies, e.g., light and radio pulses are also possible. The transmitters and the receivers can be discrete physical devices or transducers operating as either transmitters or receivers of the pulses. In the later case, the transducers simultaneously transmit pulses, and then switch mode to receive pulses.

In one configuration, the transducers are arranged linearly in a first dimension, and move laterally along a second dimension to the first to form a 2D virtual array having a set (of one or more) configurations. Other configurations (Q) and 3D arrays are also possible because the transducers can be activated individually. Furthermore, the array can be regular or irregular.

Reconstruction Method

Figure 2:
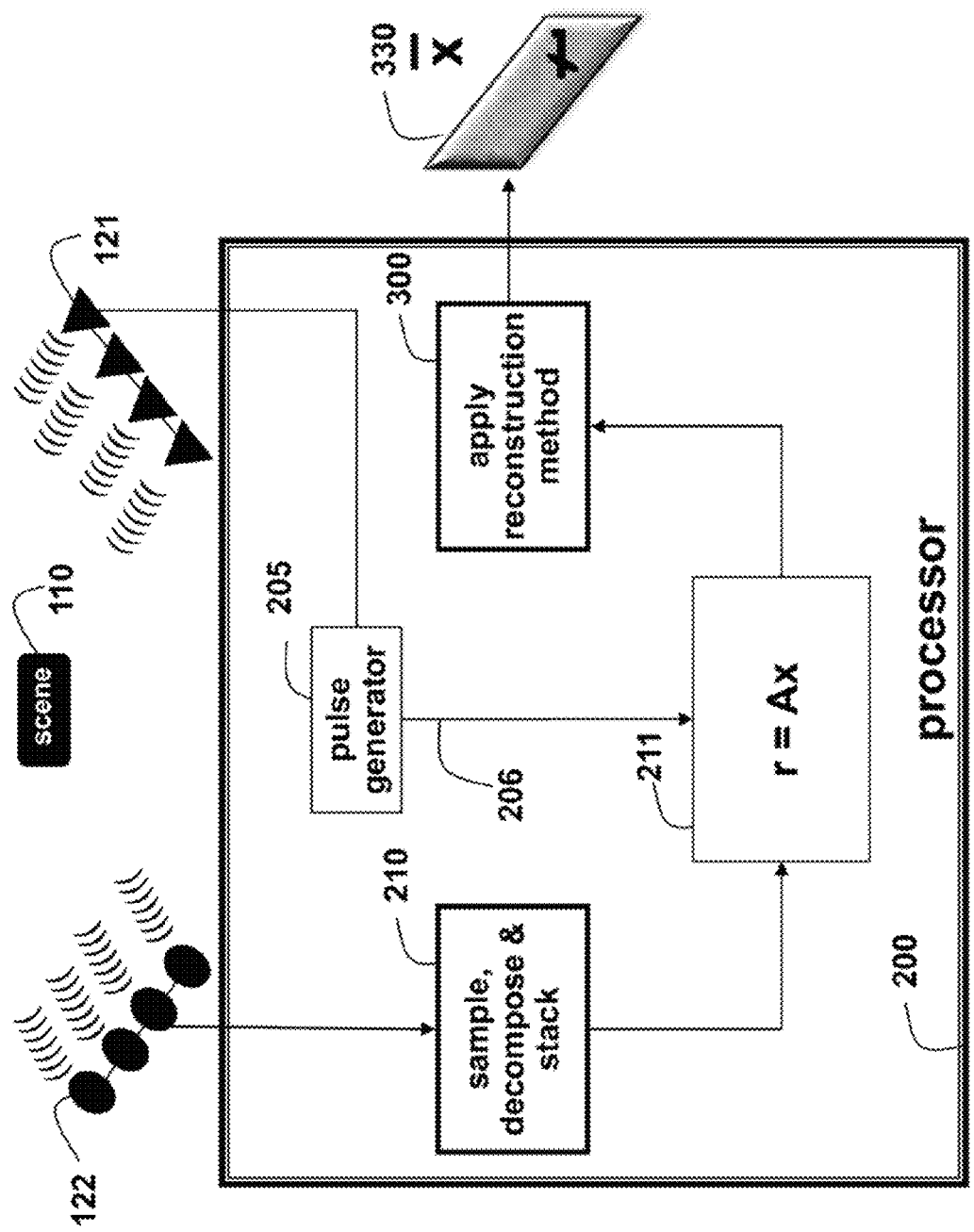
FIG. 2 is a block diagram of a method for reconstructing the scene according to embodiments of the invention.

FIG. 2 shows a method for reconstructing a scene according to embodiments of the invention. Pulses transmitted by each transducer can be represent by discrete-time samples at a Nyquist rate, i.e., twice the bandwidth of the pulse, with a corresponding sampling period (I), which is also useful for digital pulse generation and processing 210 of the received pulses. The pulse generator 205 also provides pulsing information 206 useful for the processing of the received pulses.

The received pulses are sampled, digitized and stacked in an array and then processed as a linear system 211. The methodology to form the linear system is as described in the related application. Then, the reconstruction method 300 is applied to the linear system 211 produce the reconstructed scene 330. The method is described in greater detail below with reference to FIG. 3. The method can be performed in a processor 200 connected to memory and input/output interfaces as known in the art.

Problem Formulation

Each configuration q in the set Q, for q=1, ..., Q, includes $S_q$ transmitters and $R_q$ receivers. Each transmitter emits a pulse $p_{sq}(t)$, q=1, ..., Q, s=1, ..., $S_q$, denoted by $P_{sq}(\Omega)$ in a frequency domain.

The reflect pulses are received as a signal $y_{rq}(t)$ q=1, ..., Q, s=1, ..., $R_q$ at each receiver, denoted $Y_{rq}(\Omega)$ in the frequency domain.

At a specific time instant, the scene can be consider static and discretized to a size N. The scene can be two-dimensional (2D) or three-dimensional (3D). Discretizing forms a grid of N locations in the scene, e.g., $N=N_x \times N_y$ for a 2D scene, or $N=N_x \times N_y \times N_z$ for a 3D scene. The pulse at each disceter location n in the scene is reflected according to the reflectivity $x_n$ at the location n. The reflectivity of the entire scene is denoted as $x \in \mathfrak{R}^N$.

Every location n in the scene is at a distance $d_{nsq}$ from the transmitter s for the array instance q, and distance $d_{nrq}$ from the receiver r of array instance q, for a total distance $d_{nsrq}$ in the path of a pulse from the transmitter s to the receiver r of array instance q, reflected from scene location n.

The speed of each puke is c for a particular the modality, e.g., the speed of sound for ultrasonic sensing, or the speed of light for radio or optical sensing. The total delay of the pulse from the transmitter s to the receiver r for array instance q, reflected by scene location n is $\tau_{nsrq} = d_{nsrq}/c$.

Given the scene reflectivity x, the received signal r for array instance q is $$Y_{rq}(\Omega) = \sum_n x_n \sum_s e^{-j\Omega \tau_{nsrq}} P_{sq}(\Omega),$$

which is a linear transfer function. By discretizing in frequency $\Omega$, i.e., evaluating at F discrete frequency locations $\{\Omega_1, \ldots, \Omega_F\}$, the linear transfer function for array instance/ can be expressed as a matrix equation or linear system $$Y_q = A_q x,$$

for each array instance q.

As described in the related application, the reconstruction of the scene uses a linear system of the form r=Ax. Here instead of r, we use Y to represent the vector of frequency coefficients of the reflectivity in the scene according to the received pulses, A represents the transmission operator, and x represents the (reflectivity of) scene. The recovery method 300 undoes the action of A on x, and thus, reconstructs an estimate of x, denoted $\bar{x}$, from the measurements of the coefficients Y. In the remainder, we use the bar (e.g., $\bar{x}$ or $\bar{x}_q$) to denote the reconstructed scene, which is an estimate, and no bar e.g., x) to denote the actual scene generating the data.

When moveable transducers are used as with the virtual array according to embodiments of the invention, the transducers sense and obtain a snapshot of the scene for Q array instances (different positions) over time, and the linear system becomes $Y_q = A_q x$, where $Y_q$ represents the received pulses at the $q^{th}$ position, and $A_q$ is the transmission operator, as derived by the geometry of the transducers and the scene in the $q^{th}$ position. Hence, there is a set of linear systems $$\begin{bmatrix} Y_1 \\ \vdots \\ Y_q \\ \vdots \\ Y_Q \end{bmatrix} = \begin{bmatrix} A_1 \\ \vdots \\ A_q \\ \vdots \\ A_Q \end{bmatrix} x. \quad (1)$$

The related application exploits the sparsity of the scene x to invert the system using compressive sensing. In the present application, array positions are referred to array instances.

The term "instances," is used to encompass more general set of array configurations in which, for example, the array can have different positions over time, and at any particular position different transducers can be active at any time instance.

One of the issues with the approach taken in the related application, "Method and System for Sensing Objects in a Scene Using Transducer Arrays and Coherent Wideband Ultrasound Pulses" is sensitivity to the accuracy of the parameters. Specifically, the above formulation assumes that the relative positions of all the array elements transmitters and receivers) is not subject to positioning errors and sufficiently accurate. That is required because the reconstruction relies on a coherent acquisition of all the signals at all array instances. Positioning errors invalidates the coherency assumption, and reduce the accuracy of the reconstruction.

Unfortunately, it is not possible to know the exact relative positioning of the array elements for all the configurations in the set at a sufficient accuracy, especially with virtual arrays that use the motion of platform to achieve the positioning, e.g., the platform is mounted on a vehicle, ship, airplane or satellite. Typically, it is desired that the position of the array elements is accurate to a small fraction of half the wavelength of the transmitted signal. For example, in over-the-air ultrasonic arrays operating at about a 50 kHz center frequency, the wavelength $\lambda$ is approximately 7 mm. Thus, the transducer position must be know within a small fraction, e.g., about 3.5 mm. Often, it is not possible to obtain the motion of such moving platforms, and therefore, the array position is subject to positioning errors and has an insufficient accuracy. The invented reconstruction method solves this problem in the face of the errors.

In this application, we consider each of the Q configurations of the array as a problem to be solved separately, with each information about each solution shared with other solutions. The sharing, which is used for notational purposes, enables the determination of a common support as described below. Although there are separate problems, a single process can determine all Q solutions in one comprehensive solution, and the sharing is only within the process. In other words, it is not necessary to use multiple processes. The goal is to enforce that all reconstructed scenes share a joint sparsity pattern.

By treating each problem separately, the model only requires accurate positions of the array elements with respect to some other elements to maintain the coherency of the data within each of the Q configurations. For example, the accuracy of the distances between the transducers in the first dimension is sufficient, even though the accuracy of the distances between the second (time) dimension is subject to error.

Specifically, instead of reconstructing a single $\bar{x}$ using the single linear system above, the present method reconstructs Q vectors $\bar{x}_q$, one from each instance of (1). In other words, Q transfer equations invert each one of $x_q$ $$Y_q = A_q x_q, q=1, \ldots, Q,$$

However, it is insufficient to simply invert the linear system separately for each configuration instance q. Although that type of inversion does not require coherence among instances, it also does not share any information among the solution of the instances, and leads to suboptimal solutions.

Instead, the method according to the embodiments of the invention exploits the knowledge that the scene is essentially the same for all array instances. Specifically, the method exploits the fact the sparsity pattern of the scene is the same for all instances, i.e., $\bar{x}_q$ has non-zeros at the same location for all q=, ..., Q. In other words, all reconstructed scenes $\bar{x}_q$ share a joint sparsity pattern, which means that the non-zero locations are the same in all $\bar{x}_q$.

Figure 3:
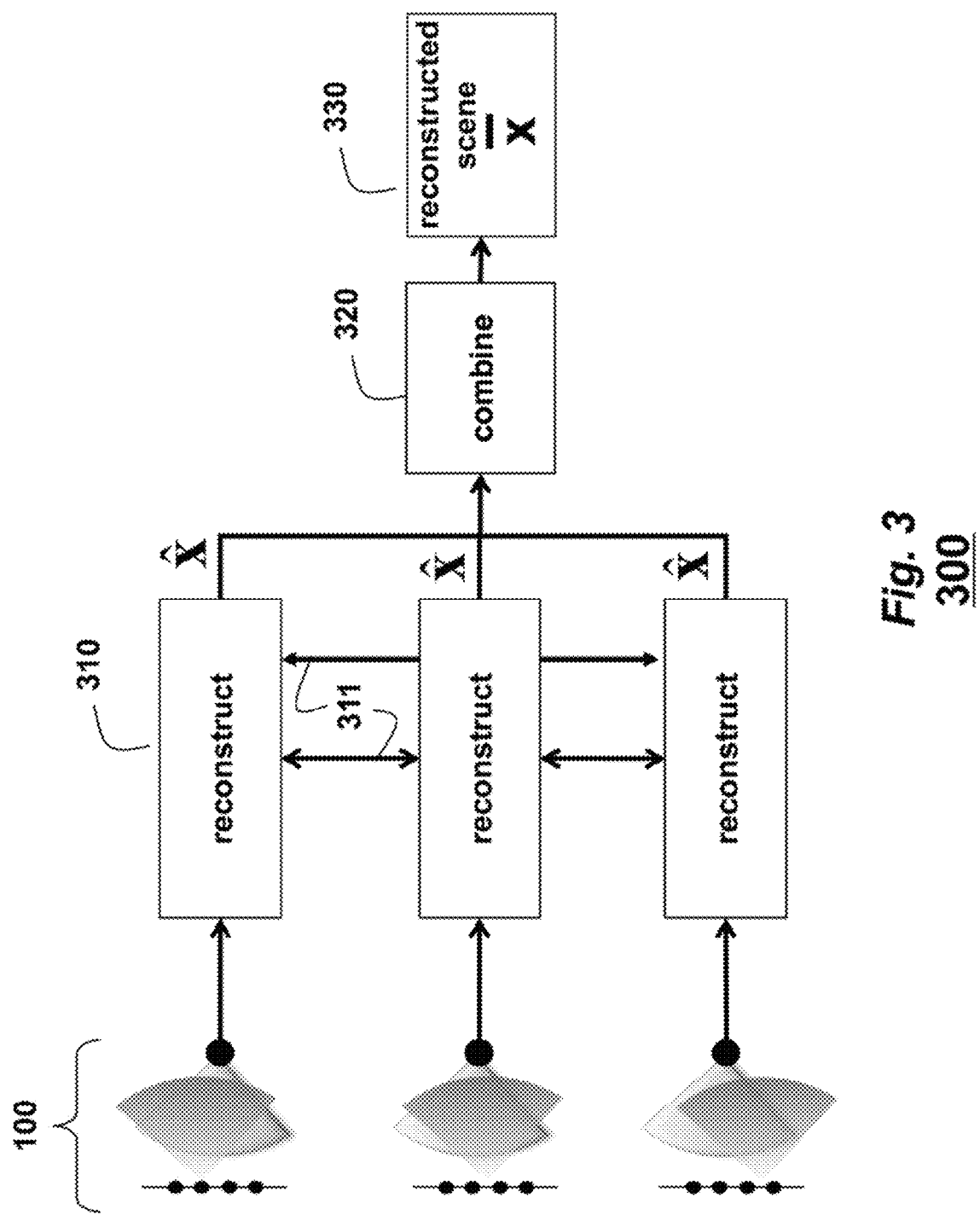
FIG. 3 is a block diagram of a joint reconstruction method according to embodiments of the invention.

FIG. 3 shows the compressive sensing (CS) reconstruction method 300 in greater detail for the array 100 at three different positions, each corresponding to an array configuration q.

During the CS reconstruction, each configurations 310 produces a scene reconstruction that is non-zero at the same location as the reconstructions from the other configurations. The reconstructions from all the configurations are then combined 320 to produce the reconstructed scene 330.

Each reconstruction, process 310 shares information 311 with the other reconstruction processes to ensure that the support at the output is common. Conceptually, the reconstructions from the Q configurations can be considered separate. However in practice, the method solves the problem of reconstructing an enlarged scene that is Q times the size of each individual scene.

To determine the joint sparsity pattern, a number of processes can be used, such as but not limited to, a greedy sparse recovery, matching pursuit (MP), orthogonal matching pursuit (OMP), iterative hard thresholding (IHT), and Compressive Sampling Matching Pursuit (CoSaMP). If a model for the scene is known, then model-based compressive sensing reconstruction methods can be used. As a common aspect, the reconstruction determines the total energy e for each of n configurations as $$e_n = \sqrt{\sum_q (q)_n^2},$$

where $e_n$ denotes the $n^{th}$ element of an energy vector e. The reconstruction determine $\bar{x}_q$ such that $Y_q \approx A_q \bar{x}_q$, while ensuring that the energy vector $e_q$ remains sparse.

For example, the model-based CoSaMP or IHT can be used, optimizes $$\min_{x_q, q=1,\ldots,Q} \sum_{q=1}^{Q} \|Y_q - A_q x_2\|_2^2 \quad \text{s.t.} \quad \|e\|_0 \leq K$$

for some pre-defined sparsity level K. Alternatively the following convex optimization method can be used:

$$\min_{x_q, q=1,\ldots,Q} \sum_n \sqrt{\sum_q (x_q)_n^2} \quad \text{s.t.} \quad Y_q \approx A_q x_q,$$

or variants, such as $$\min_{x_q, q=1,\ldots,Q} \sum_n \sqrt{\sum_q (x_q)_n^2} \quad \text{s.t.} \quad \|Y_q - A_q x_q\|_2 \leq \epsilon,$$

$$\min_{x_q, q=1,\ldots,Q} \sum_n \sqrt{\sum_q (x_q)_n^2} + \lambda \sum_{q=1}^{Q} \|Y_q - A_q x_q\|_2^2,$$

or any other joint sparsity formulation, or process. The optimization produces a solution $\bar{x}_q$ for each array configuration q.

The solutions are then combined to a single solution 330 using a fusion or merging procedure. For example, averaging determines $$\bar{x} = \frac{1}{Q} \sum_{q=1}^{Q} \bar{x}_q,$$

magnitude averaging determines $$(\bar{x})_n = \frac{1}{Q} \sum_{q=1}^{Q} |(\bar{x}_q)_n|,$$

and root-mean-square (RMS) combining determines $$(\bar{x})_n = \sqrt{\sum_{q=1}^{Q} |(\bar{x}_q)_n|^2}, \quad (13)$$

which is identical to e.

The individual solutions can also be combined by identifying a common support:

$$(\bar{x})_n = \begin{cases} 1 & \text{if } (\bar{x}_q)_n \neq 0 \text{ for some } q \\ 0 & \text{otherwise} \end{cases}$$

The latter combining method eliminates any information on the values of $\bar{x}$, other than the values are non-zero. In other words, the combining only identifies the common support of the signals. Whether the eliminated information is important or not depends on the applications. For example, object detection applications often only require the location of the object, i.e., the support for $\bar{x}$, and not the actual values.

The joint sparsity reconstruction according to the embodiments of the invention assume that the relative positioning within each array configuration is well estimated, but not necessarily for all array configurations. If the positioning for groups of array instances can be estimated precisely, then the groups of array instances can be combined, solving for a separate solution for each group, and enforcing joint sparsity for all the group solutions, instead of for cacti instance solution. Such grouping improves reconstruction performance because it exploits the knowledge of the precise positioning in the reconstruction, i.e., exploit the coherence of the data.

Applications

As described in the related application, the method can be used for driver assistance in vehicle sensing applications, robotic applications, surveillance and security applications.

Effect of the Invention

The embodiments of the invention use a small number of transducers that transmit and receive wideband ultrasound pulses. Each transducer emits a unique pulse at a frequency, with a different wide frequency content. Because each pulse is unique, it can be easily identified in the receivers, which allows the system to estimate the distance of the various objects in the scene from the corresponding transmitter. The wide bandwidth of the pulse serves the following purposes. Pulses from each transmitter are unique with respect to other transmitters. Fewer transducers can be used because the diversity provided by using more frequencies.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A system for reconstructing a scene, comprising:
an array of radar transducers configured to transmit pulses at the scene and receive the pulses reflected by the scene, wherein the array has a set of configurations subject to positioning errors;
a processor connected to the array of transducers for sampling and decomposing each received pulse to produce frequency coefficients stacked in a set of linear system of equations modeling a reflectivity of the scene, wherein there is one linear system of equations for each configuration; and
applying a reconstruction method to the set of linear system of equations by
solving each linear system of equations separately to obtain a corresponding solution, while the corresponding solutions share information during the solving; and
combining the solutions to reconstruct the scene, wherein the combining produces an average of the solutions.

2. The system of claim 1, wherein the information is a support of each solution during the reconstructing.

3. The system of claim 2 wherein the support is common among the solutions during the reconstructing.

4. The system of claim 2, wherein the support is enforced to be identical for all solutions during the reconstructing.

5. The system of claim 1, wherein a joint-sparsity model is used during the reconstructing.

6. The system of claim 5, wherein a convex optimization is used during the reconstructing.

7. The system of claim 5, wherein a greedy method is used during the reconstructing.

8. The system of claim 1, wherein a model of the scene is enforced during the reconstructing.

9. The system of claim 1, wherein the average is an average magnitude of coefficients of the solutions.

10. The system of claim 1, wherein the average is an average of square magnitudes of coefficients of the solutions.

11. The system of claim 10, wherein the combining takes a square root of the average.

12. The system of claim 1, wherein the combining determines a common support for the solutions.

13. The system of claim 1, further comprising:
merging the linear systems of equations.

* * * * *